United States Patent [19]
Brandle, Jr. et al.

[11] Patent Number: 6,104,529
[45] Date of Patent: Aug. 15, 2000

[54] OPTICAL FIBER COMMUNICATION SYSTEM EMPLOYING WIDE BAND CRYSTAL ALLOY LIGHT GENERATION DEVICES

[75] Inventors: Charles David Brandle, Jr., Basking Ridge; Lynn Frances Schneemeyer, Westfield; Gordon Albert Thomas, Princeton; William Larry Wilson, Somerville, all of N.J.

[73] Assignee: Lucent Technologies Inc., Murray Hill, N.J.

[21] Appl. No.: 09/264,657

[22] Filed: Mar. 8, 1999

[51] Int. Cl.[7] ........................................................ H01S 3/00
[52] U.S. Cl. ............................................. 359/342; 372/41
[58] Field of Search ................................ 359/342; 372/41, 372/42

[56] References Cited

U.S. PATENT DOCUMENTS

| | | | |
|---|---|---|---|
| 4,428,646 | 1/1984 | Lighty | 350/96.31 |
| 5,210,766 | 5/1993 | Winer et al. | 372/40 |
| 5,535,051 | 7/1996 | Basiev et al. | 359/342 |
| 5,717,517 | 2/1998 | Alfano et al. | 359/342 |

*Primary Examiner*—Mark Hellner
*Attorney, Agent, or Firm*—Mathews, Collins, Shepherd & Gould, P.A.

[57] ABSTRACT

In accordance with the invention, an improved optical communication system employs light-generating devices comprising a phonon-tuned crystal alloy host doped with an optically active atom. In one embodiment, the crystal alloy host and optically active atom respectively comprise spinel and nickel. The spinel material is typically a solid solution between magnesium aluminate and magnesium gallate.

16 Claims, 3 Drawing Sheets

OPTICAL FIBER COMMUNICATION SYSTEM EMPLOYING WIDE BAND CRYSTAL ALLOY LIGHT GENERATION DEVICES

FIELD OF THE INVENTION

This invention relates to optical fiber communication systems, and in particular, to a system employing a wide band crystal alloy light-generating device. It also relates to such light generation devices and to compositions employed in them.

BACKGROUND OF THE INVENTION

The development of the erbium-doped fiber devices (EDFDs) has greatly impacted optical fiber communications. This is because EDFDs generate light efficiently in the 1530–1560 nm low-loss wavelength range for silica fibers. For the most part, new high capacity systems operate within this range at a nominal wavelength of 1550 nm.

The recent deployment of WDM optical fiber systems is due in large part to the EDFD. WDM optical fiber systems maintain span distances of hundreds of kilometers, eliminating the need for optical-to-electronic repeaters while at the same time increasing capacity by increasing the number of WDM channels. The amplification band of EDFDs is sufficiently broad to simultaneously amplify multiple channels of a WDM set. For example a typical EDFD with an amplification band about 30 nm wide is adequate for operating a 40 channel system, with channels 0.8 nm apart.

Light-generating devices which operate efficiently over a variety of infrared frequencies have potential for increasing the number of channels that can be operated in a WDM optical fiber system. Systems employing such a light-generating device would be capable of exploiting the newly broadened wavelength bandwidth (~1210 nm-1700 nm) of more recent optical fibers. These fibers exhibit another useful low-loss wavelength range centered at about 1310 nm. Unfortunately, such a light-generating device has not been developed. Materials based on $Nd^{+3}$/fluoride glass and $Pr^{+3}$/ZBLAN have received serious attention for use at 1310 nm, but have limitations such as requirements for high pump powers.

Light-generating devices made from crystalline materials have many well known advantages over devices made from glass. These advantages include avoiding the radiationless transition specific to glass fibers, smaller size, and suitability for integration on a substrate. U.S. Pat. No. 5,535,051 describes a WDM optical fiber system using a crystal optical amplifier. The amplifier uses a disordered, crystalline host to broaden the useful range of narrow-band active dopants such as erbium and praseodymium. Unfortunately, this amplifier is not capable of operating efficiently at 1310 nm.

Accordingly, there remains a need for a multi-wavelength optical fiber system employing an improved wideband light generating device.

SUMMARY

In accordance with the invention, an improved optical communication system employs light-generating devices comprising a phonon-tuned crystal alloy host doped with an optically active atom. In one embodiment, the crystal alloy host and optically active atom respectively comprise spinel and nickel. The spinel material is typically a solid solution between magnesium aluminate and magnesium gallate.

BRIEF DESCRIPTION OF THE DRAWINGS

The advantages, nature, and various additional features of the invention will appear more fully upon consideration of the illustrative embodiments now to be described in detail in connection with the accompanying drawings wherein.

It is to be understood that these drawings are for purposes of illustrating the concepts of the invention and, except for graphical illustrations, are not to scale.

DETAILED DESCRIPTION OF THE INVENTION

In accordance with the invention, improved optical fiber communication systems employ wide-band crystal alloy light generating devices which exhibit near infrared (IR) fluorescence around 1310 nm. The preferred crystal alloys are transition-metal-doped crystal alloys comprising phonon-tuned crystal alloy hosts doped with an optically active atom. An example is $Ni^{2+}$-doped (1–5% substitutional doping levels of $Ni^{2+}$ in place of $Mg^{2+}$ or other $^{2+}$ ions) spinels in the solid solution between magnesium aluminate spinel and magnesium gallate ($MgAl_{2-x}Ga_xO_4$) where x typically ranges between greater than 0 and less than 2.0.

The compositions of the invention permit the fabrication of light-generating devices such as optical amplifiers and light sources which operate at a very wide range of optical wavelengths. Such devices can be constructed as free-standing crystals or as epitaxial layers, and are capable of replacing or supplementing conventional fiber light generating devices used in WDM optical fiber systems and other systems and subsystems which operate at very wide range of optical wavelengths. Light-generating devices fabricated from the inventive compositions retain the advantages of crystalline devices and the broad bandwidths of transition-metal dopants, while providing for improved efficiency via the crystal alloy composition.

The compositions of the invention were developed by examining oxides such as magnesium aluminate spinel ($MgAl_2O_4$) (crystallizes in a face-centered cubic structure) doped with nickel ($Ni^{2+}$), which exhibits fluorescence near 1310 nm and relatively long emission lifetimes, on the order of 1 msec at room temperature. While the absence of appreciable gain in some $Ni^{2+}$ materials at room temperature has been attributed to excited-state absorption (ESA), non-radiative deactivation is an important parasitic phenomena. Phonon mediated non-radiative deactivation results in a large decrease in quantum yield and emission lifetime because it provides alternate pathways for energy dissipation and thus, likely makes the requisite inversion for stimulated emission more difficult. The phonon spectrum of a material, which controls radiative deactivation, is defined by the structure of the host lattice.

Figure 1:
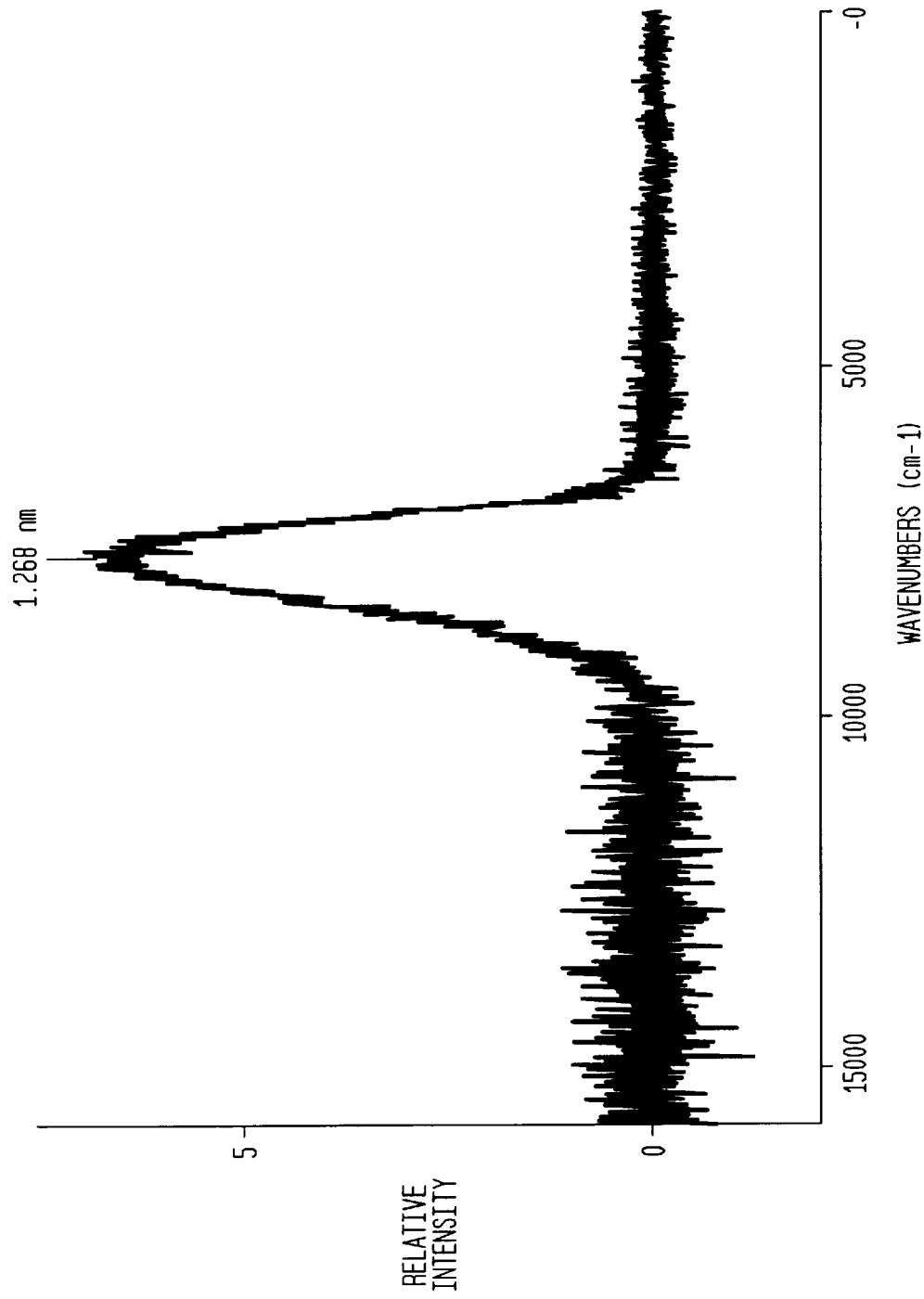
FIG. 1 is a plot showing luminescence intensity as a function of wavenumber for magnesium aluminum spinel doped with nickel.

FIG. 1 shows the emission spectrum of nickel doped $MgAl_2O_4$. As can be observed, nickel doped $MgAl_2O_4$ exhibits a fluorescence peak that ranges between 1100 nm to 1500 nm and is centered around 1250 nm. The observed emission lifetime at room temperature of nickel-doped $MgAl_2O_4$ is about 300 μsec. The isostructural gallate phase $MgGa_2O_4$ doped with nickel exhibits similar fluorescence with about 20–50 times the peak intensity and a lifetime of about 1 millisecond, but is extremely difficult to grow. Importantly, the observed emission is temperature independent indicating that phonon deactivation is greatly decreased in $MgGa_2O_4$.

The nickel-doped $MgAl_{2-x}Ga_xO_4$ solid solution of the invention combines the important optical properties of $MgAl_2O_4$ and $MgGa_2O_4$. Moreover, crystals of $MgAl_{2-x}Ga_xO_4$ are more readily grown than crystals of $MgGa_2O_4$, and $MgAl_{2-x}Ga_xO_4$ has an atomic mass and crystal structure which modifies or shifts the phonon spectrum such that phonon-mediated deactivation processes are minimized. Accordingly, fluorescence intensity and emission lifetime of the inventive composition can be maximized.

EXPERIMENTAL TESTING

Various measurements were made on samples of Nickel-doped $MgAl_{2-x}Ga_xO_4$. Optical absorption measurements were performed using a conventional Fourier-transform spectrometer. Time resolved emission data were obtained using a 10 ns Nd:YAG excitation pulse with the spectrally resolved emission imaged onto a fast InGaAs photodetector. The luminescence transients were averaged on a digitizing oscilloscope.

Crystal phonon frequencies were measured by optical reflectivity using a far-infrared version of the Fourier-transform spectrometer. The melting behavior of $MgAl_{2-x}Ga_xO_4$ was examined using radio-frequency heating under nitrogen or $N_2/1\%$ $O_2$ atmospheres. A nearly monotonic decrease in melting temperature from 2100° C. for $MgAl_2O_4$ to 1970° C. for $MgGa_2O_4$ was observed. Gallium oxide vaporization from the melt increases with increasing gallium concentration. Crystals from the cooled melts were used for lifetime measurements and measurements of the phonon frequencies. A modified Czochralski technique was made to grow an alumina-rich solid solution crystal. A corkscrew sample with adequate crystal quality for spectroscopic studies was obtained.

Figure 2:
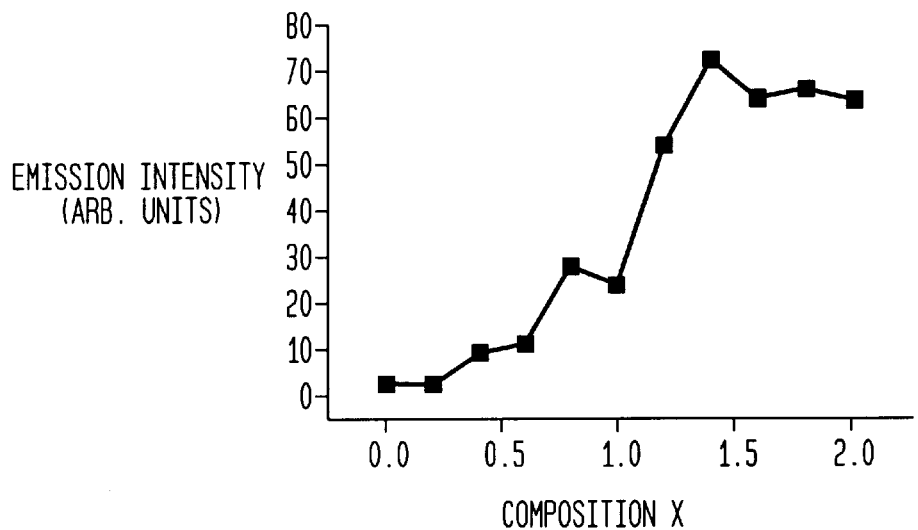
FIG. 2 is a plot showing $Ni^{2+}$ emission intensity as a function of gallium present in $MgAl_{2-x}Ga_xO_4$.
Figure 3:
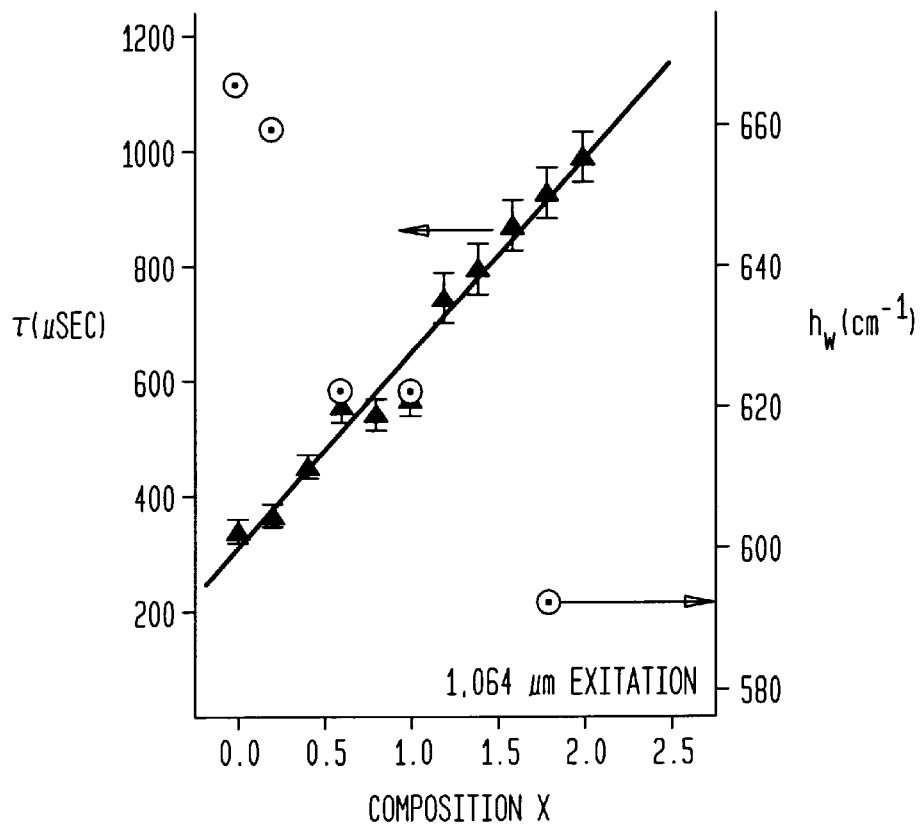
FIG. 3 is a plot showing emission lifetime and phonon frequency as a function of gallium present in $MgAl_{2-x}Ga_xO_4$.

FIG. 2 shows $Ni^{2+}$ emission intensity as a function of Ga present in $MgAl_{2-x}Ga_xO_4$, and FIG. 3 shows emission lifetime τ (illustrated with triangles) and phonon frequency (illustrated with circles) as a function of Ga present in $MgAl_{2-x}Ga_xO_4$. As can be seen, $MgAl_{2-x}Ga_xO_4$ exhibits a nearly two orders of magnitude increase in fluorescence intensity (FIG. 2) and emission lifetime τ (FIG. 3) at 1310 nm with increasing gallium in the composition. This is due to a downward shift in the phonon frequency with increasing gallium content in the spinel host, which reduces non-radiative deactivation. Since phonon frequencies are quantized as the lattice is continuously tuned (by increasing the gallium content), the composition of the $MgAl_{2-x}Ga_xO_4$ can be tuned to a lattice structure between two phonon states, thus increasing the fluorescence intensity of the composition.

Figure 4:
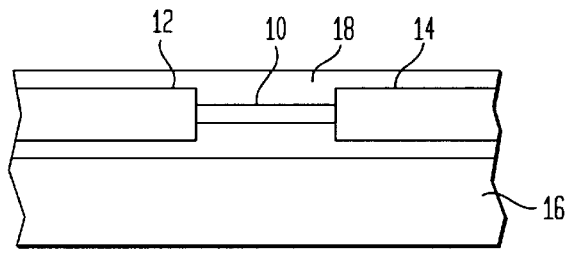
FIG. 4 is a sectional view of an inline, free standing, single crystal amplifier fabricated from a transition-metal-doped crystal alloy composition of the invention.

FIG. 4 shows a free-standing crystal optical amplifier 10 fabricated from the transition-metal-doped crystal alloy composition of the invention. The amplifier crystal 10 is used for inline coupling incoming and outgoing single-mode fibers 12, 14 in a fiber amplifier structure. The amplifier 10 can be 1 cm in length and of a square cross-section. The fiber amplifier structure is supported on a silicon substrate 16, and is surrounded by an epoxy adhesive coating 18.

Figure 5:
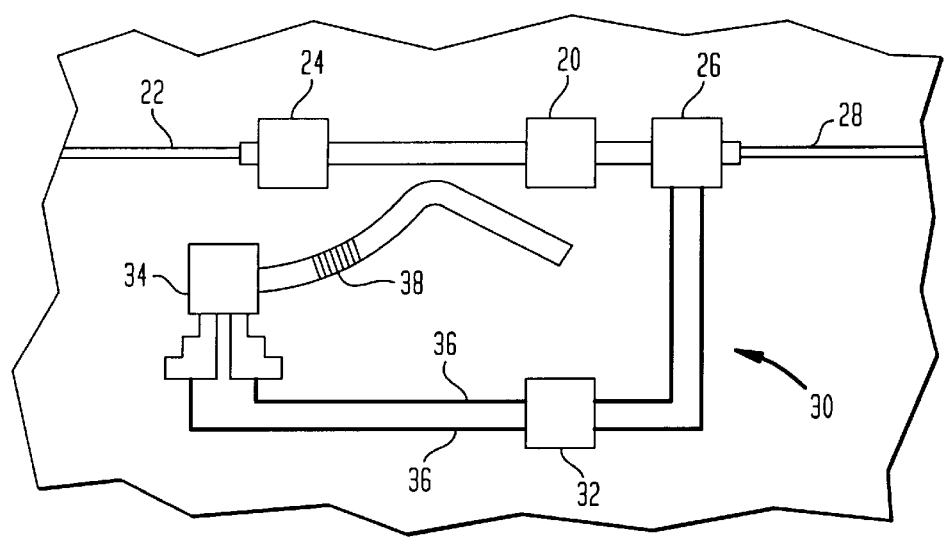
FIG. 5 is a schematic view of a portion of an optoelectronic integrated circuit having a epitaxially grown crystal amplifier fabricated from the transition-metal-doped crystal alloy composition of the invention.

FIG. 5 shows an epitaxially-grown crystal amplifier 20 fabricated from the transition-metal-doped crystal alloy composition of the invention. The amplifier 20 is used in an optoelectronic integrated circuit comprised of an input fiber 22 which transmits an incoming signal that is amplified by the amplifier 20 to result in an outgoing signal on an output fiber 28. The incoming signal is first introduced onto a planar waveguide section connected to a first isolator 24 which prevents introduction of reflected radiation into the input fiber 22. The signal passes through the amplifier 20 into a second isolator 26 and then into the output fiber 28. A feedback circuit 30 includes a monitor 32 and conductors 36 which together with an electrical source (not shown) biases a pump laser 34 to a lasing threshold. The laser output is stabilized by an interference grating 38.

Figure 6:
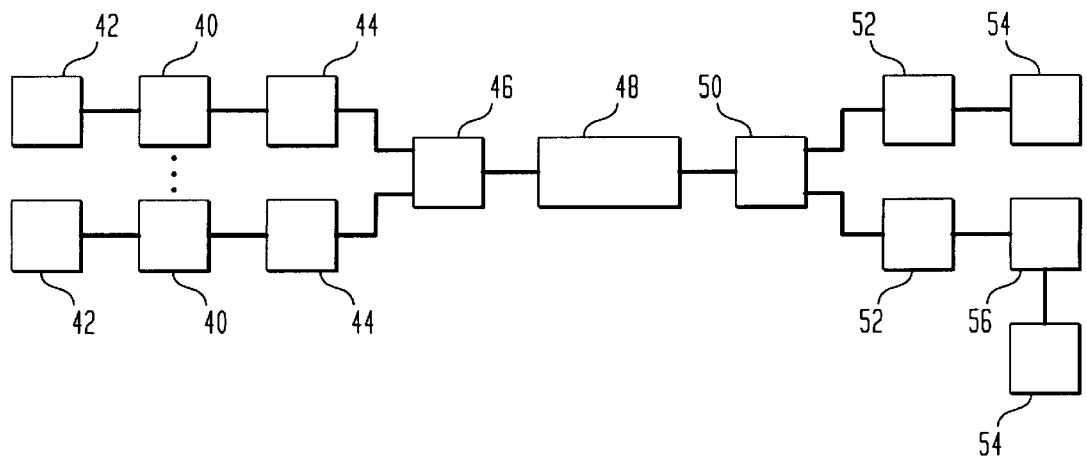
FIG. 6 shows an optical fiber system utilizing one or more light-generating devices fabricated from the transition-metal-doped crystal alloy composition of the invention.

FIG. 6 shows an optical fiber communication system utilizing at least one light-generating device fabricated from the transition-metal-doped crystal alloy composition. The fiber system can be of the type employing wavelength division multiplexing or time division multiplexing. The system includes one or more light sources 40 fabricated from the composition of the invention, optical or electrical pumps 42 for pumping the light sources 40, modulators 44 for modulating the light produced by the light sources 40, a multiplexer 46 for combining the modulated light signals for transmission, a transmission medium 48 such as an optical fiber or free space for transmission of the multiplexed light signal, a demultiplexer 50 for separating the multiplexed light signal into the individual modulated light signals, receivers 52 for receiving the light signals, and decoders 54 for converting the light signals into electrical signals. If the distance between the demultiplexer 50 and any one of the receivers 52 is such that the corresponding light signal requires amplification, an amplifier 56 fabricated from the composition of the invention can be utilized for amplification. The use of the alloy light-generating devices and amplifiers along with comparably wideband system components, permits construction of a system of enhanced information-carrying capacity.

While the foregoing invention has been described with reference to the above embodiments, various modifications and changes may be made without departing from the spirit of the present invention. In one example, the transition-metal-doped crystal alloy compositions can comprise $Cr^{4+}$-doped forsterite in the solid solution between magnesium silicate and magnesium germanate ($Mg_2Si_{1-x}Ge_xO_4$) where x typically ranges between greater than 0 and less than 1.0. In a second example, the crystal alloy composition can be doped with a rare earth element if wide band operation is not necessary. These and other modifications and changes are considered to be within the scope of the claims.

What is claimed is:

1. In a device for generating light comprising a crystal host doped with an optically active atom for flourescing from an excited state,
   the improvement wherein:
      the crystal host comprises a solid solution of at least two crystalline materials, the proportions of the materials minimizing phonon-mediated deactivation from said excited state.

2. The device according to claim 1, wherein the optically active atom comprises a rare earth element.

3. The device according to claim 1, wherein the optically active atom comprises a transition metal.

4. The device according to claim 3, wherein the transition metal is selected from the group consisting of nickel and chromium.

5. The device according to claim 1, wherein the crystal alloy host is selected from the group consisting of spinel and forsterite.

6. The device according to claim 5, wherein the spinel comprises a solid solution between magnesium aluminate and magnesium gallate.

7. The device according to claim 6, wherein the solid solution comprises $MgAl_{2-x}Ga_xO_4$.

8. The device according to claim 5, wherein the forsterite comprises a solid solution between magnesium silicate and magnesium germanide.

9. The device according to claim 8, wherein the solid solution comprises $Mg_2Si_{1-x}Ge_xO_4$.

10. The device according to claim 1, wherein the device is for simultaneous amplification of a plurality of WDM channels.

11. The device according to claim 1, wherein the device is tunable to a wavelength range of 1250nm to 1600 nm.

12. The device according to claim 1, wherein the crystal alloy host comprises a free-standing crystal.

13. The device according to claim 1, wherein the crystal alloy host comprises at least one epitaxial layer.

14. An optical fiber system including at least one light generating device according to claim 1.

15. The system according to claim 14, wherein the system is a wavelength division multiplexing system.

16. The system according to claim 14, wherein the system is a time division multiplexing system.

* * * * *